United States Patent [19]

Burke

[11] Patent Number: 5,564,334

[45] Date of Patent: Oct. 15, 1996

[54] PIN OVENS AND TRANSFER DEVICES THEREFOR

[75] Inventor: David J. Burke, Bolton, United Kingdom

[73] Assignee: LTG Lufttechnische GmbH, Stuttgart, Germany

[21] Appl. No.: 174,163

[22] Filed: Dec. 27, 1993

Related U.S. Application Data

[63] Continuation of Ser. No. 784,590, Oct. 29, 1991, Pat. No. 5,272,970.

[51] Int. Cl.[6] .................................................. B41F 17/08
[52] U.S. Cl. ............................ 101/40; 101/40.1; 101/37; 198/487.1; 198/803.12; 34/105
[58] Field of Search ............................. 101/37, 40, 40.1; 198/441, 476.1, 803.12, 487.1; 34/203, 105

[56] References Cited

U.S. PATENT DOCUMENTS

| 2,338,032 | 12/1943 | Friden . |
| 3,365,158 | 1/1968 | Dowling . |
| 3,469,670 | 9/1969 | Cartwright . |
| 3,599,777 | 8/1971 | Johnson . |
| 3,894,237 | 7/1975 | Choate et al. . |
| 3,996,851 | 12/1976 | Urban . |
| 4,880,108 | 11/1989 | Burk ................................. 198/487.1 |
| 4,927,002 | 5/1990 | Springman . |
| 4,930,620 | 6/1990 | Springman ........................ 198/803.12 |
| 5,272,970 | 12/1993 | Burke .................................... 101/40 |

FOREIGN PATENT DOCUMENTS

| 630577 | 12/1927 | France . |
| 2297141 | 6/1976 | France . |
| 2706829 | 9/1977 | Germany . |
| 61-37611 | 2/1986 | Japan . |
| 595943 | 2/1978 | Switzerland . |
| 159821 | 10/1921 | United Kingdom . |
| 950085 | 2/1964 | United Kingdom . |
| 1496464 | 12/1977 | United Kingdom . |
| 1533741 | 11/1978 | United Kingdom . |
| 2001746 | 2/1979 | United Kingdom . |
| 1591882 | 7/1981 | United Kingdom . |

*Primary Examiner*—John S. Hilten
*Attorney, Agent, or Firm*—St. Onge Steward Johnston & Reens

[57] ABSTRACT

A pin oven for curing a decorative or other coating laid down by a rotary decorator on cans has an associated transfer device by which the cans are decelerated and transferred in succession from the decorator onto the chain of the oven. The chain carries two cows of pins which are arranged in staggered and offset relation. By operating at a smaller chain circulating speed than the can output velocity of the decorator, the oven provides benefits in the size and thermal efficiency of the oven and reduced chain wear.

15 Claims, 15 Drawing Sheets

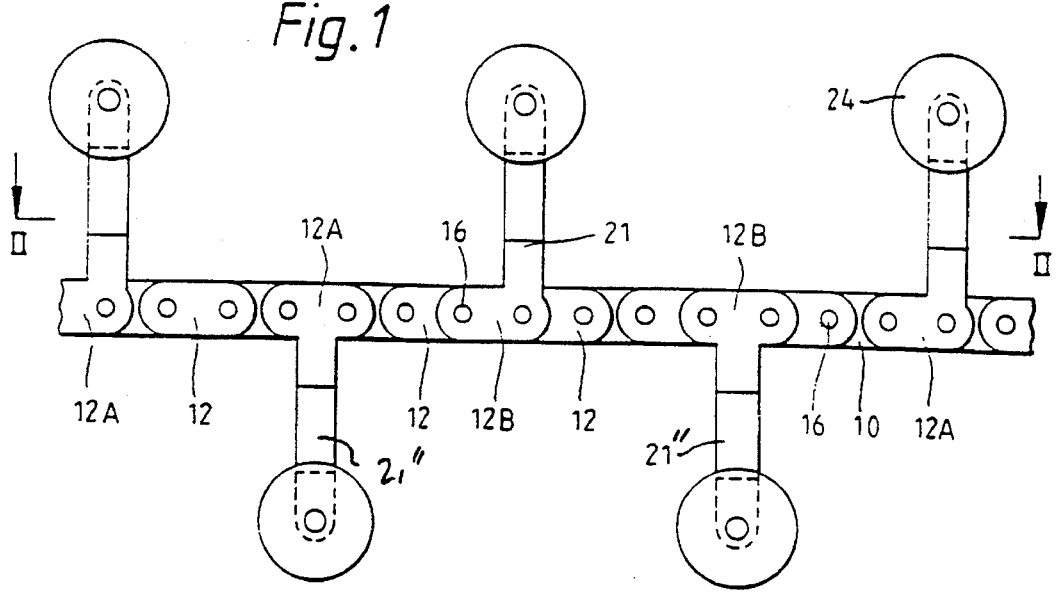
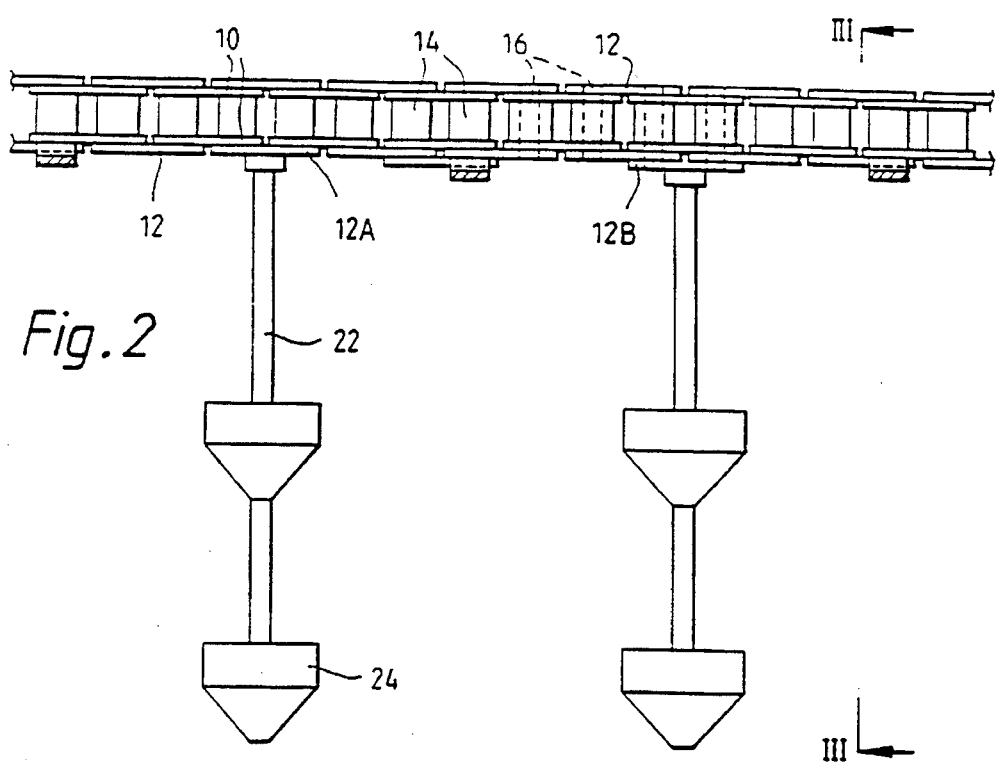

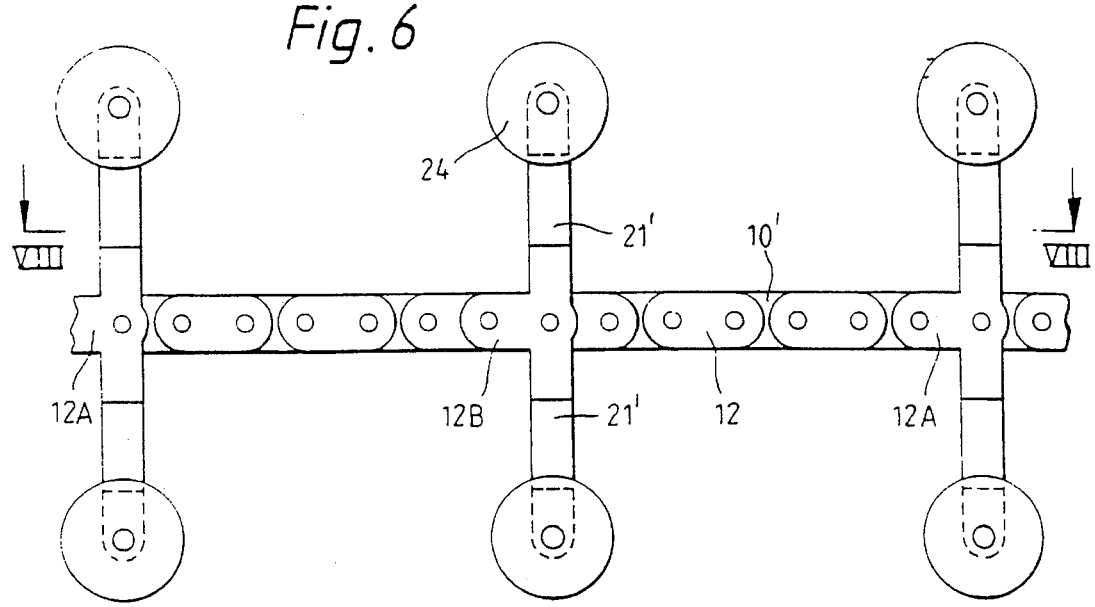
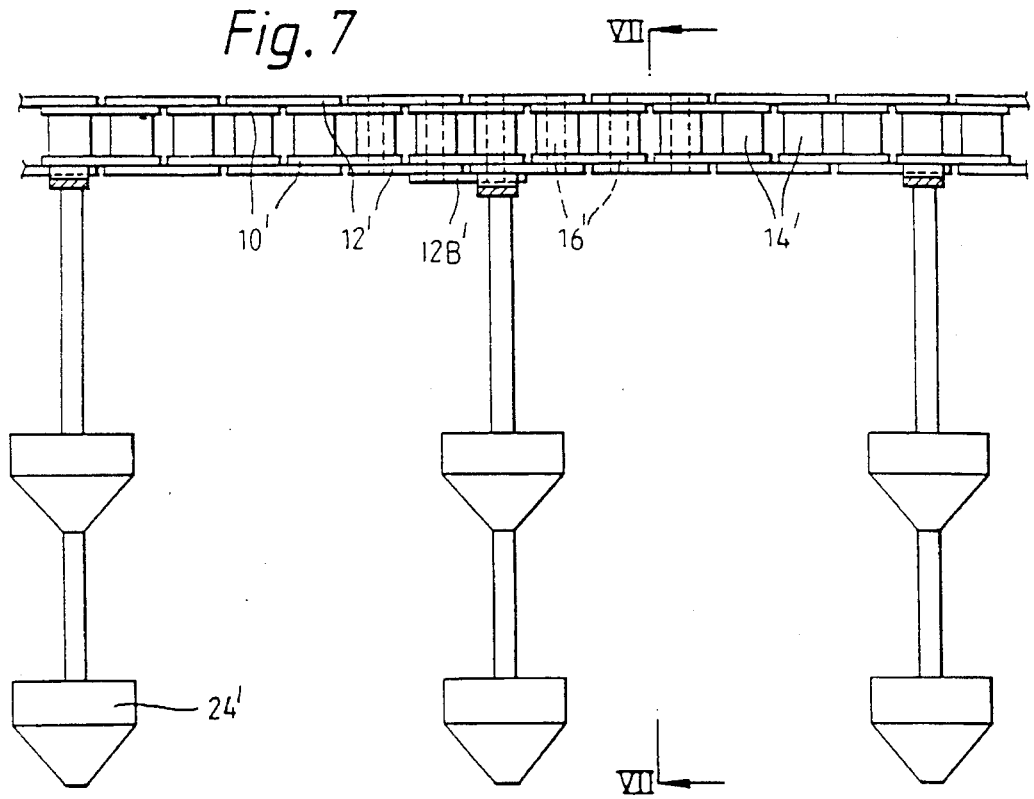

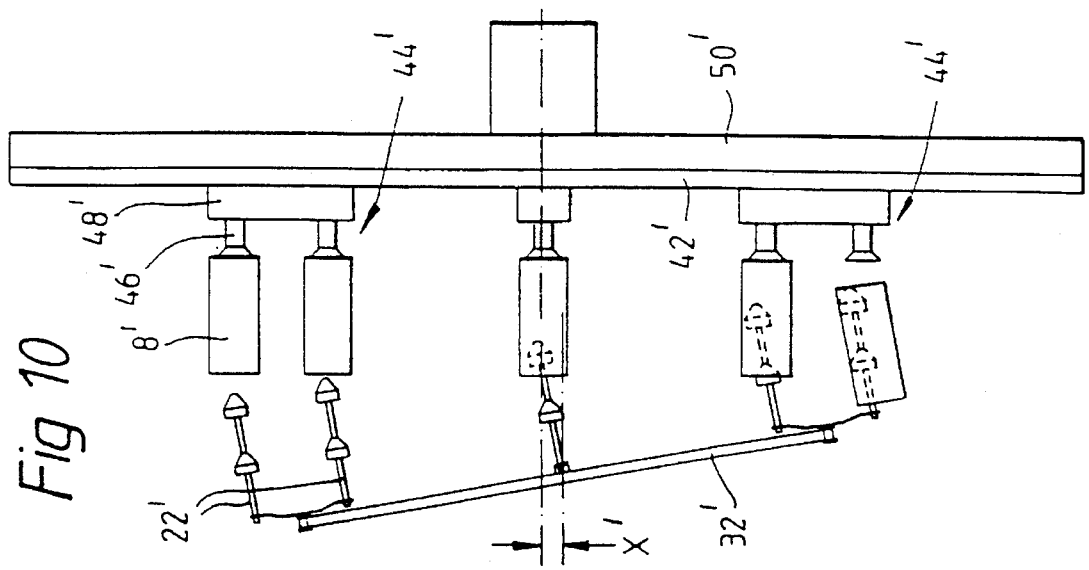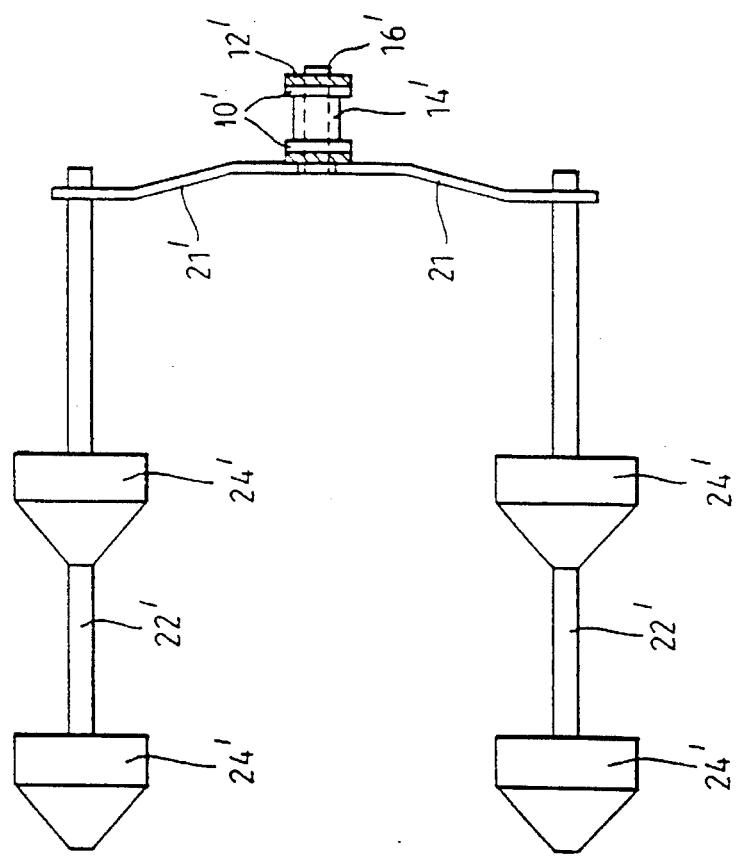

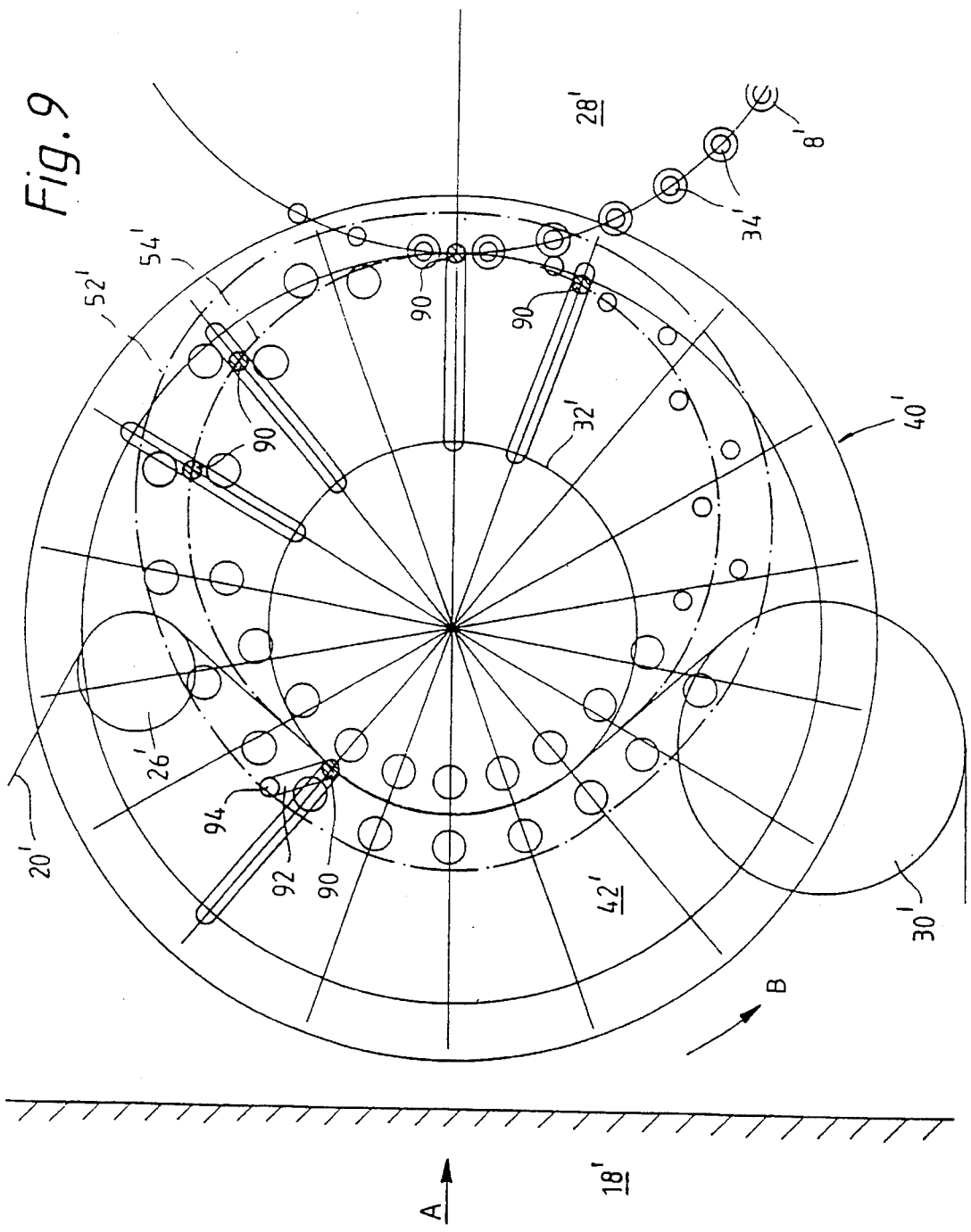

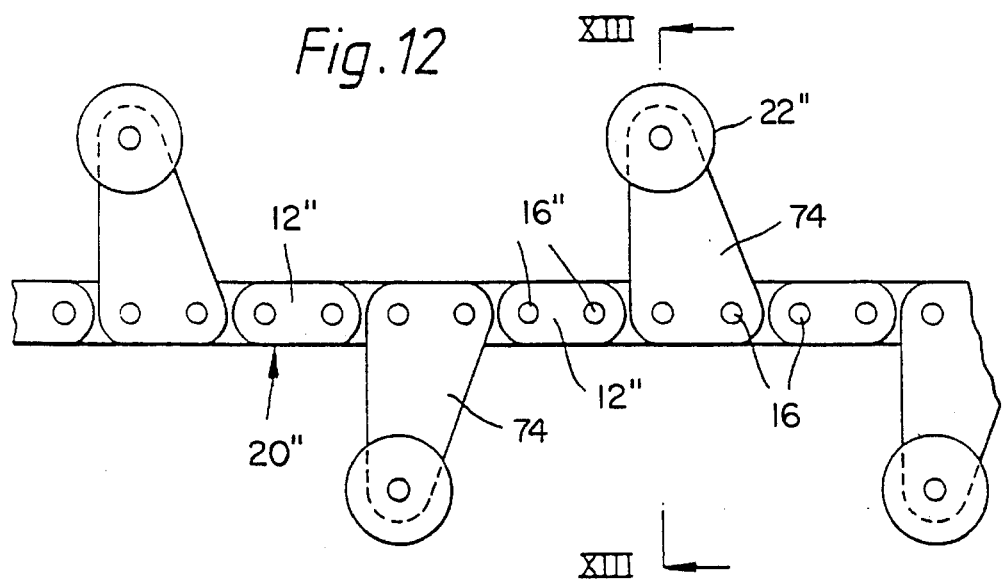
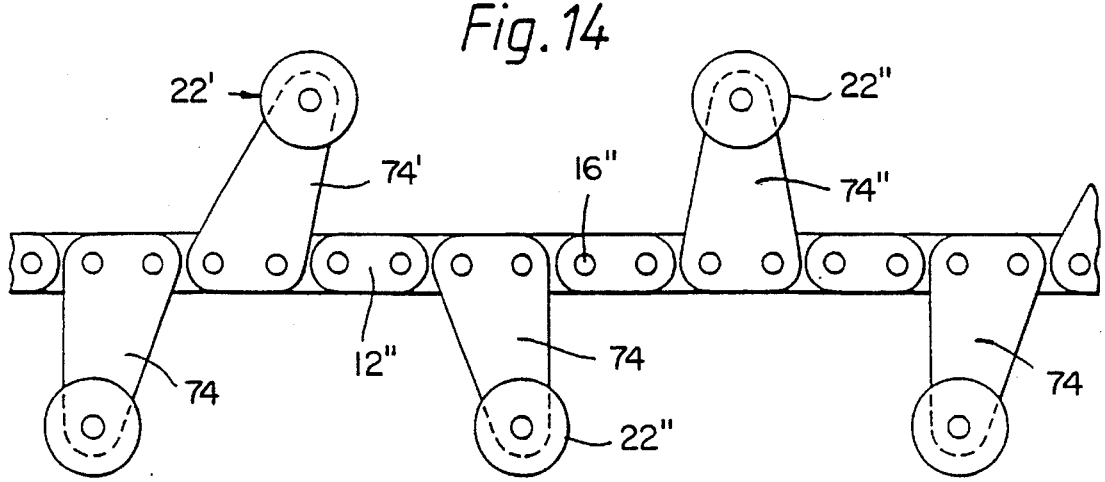

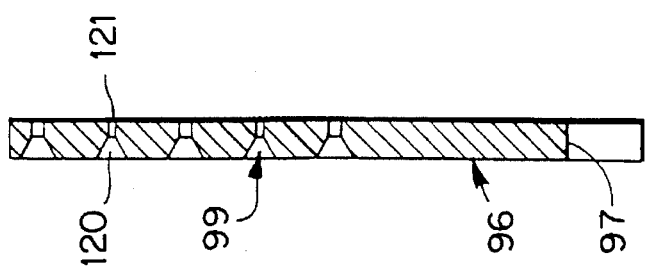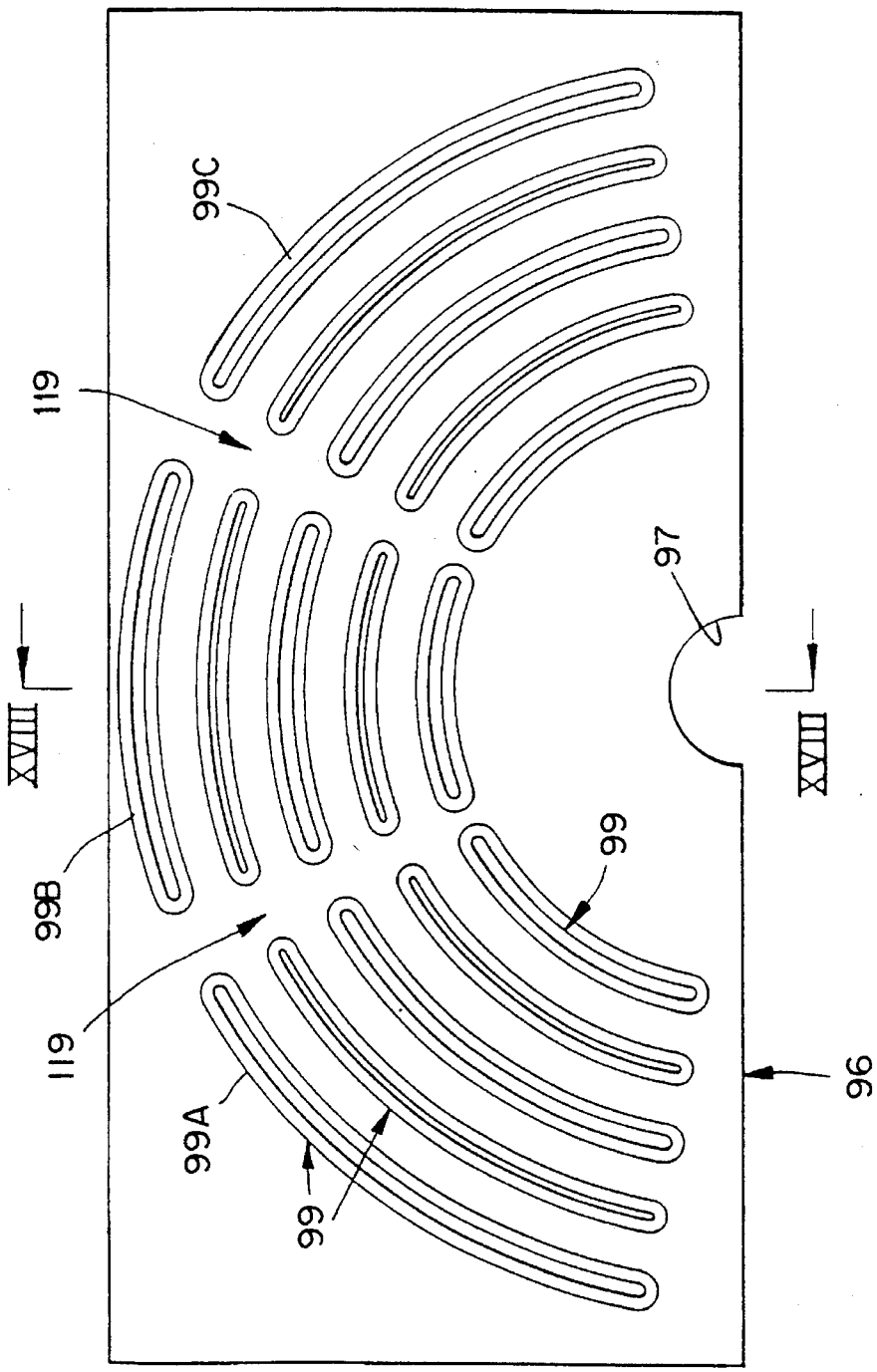

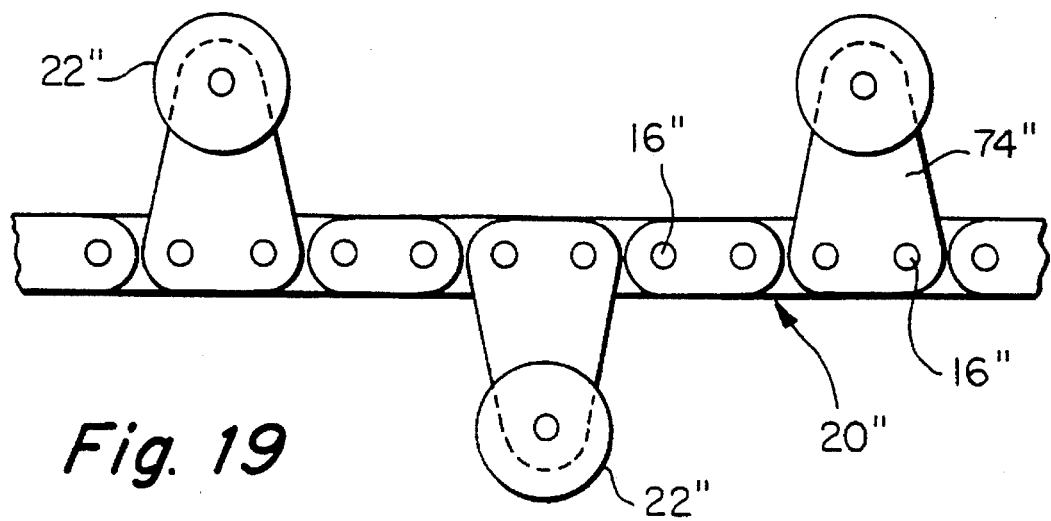
Fig. 19
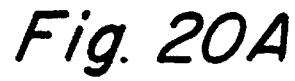
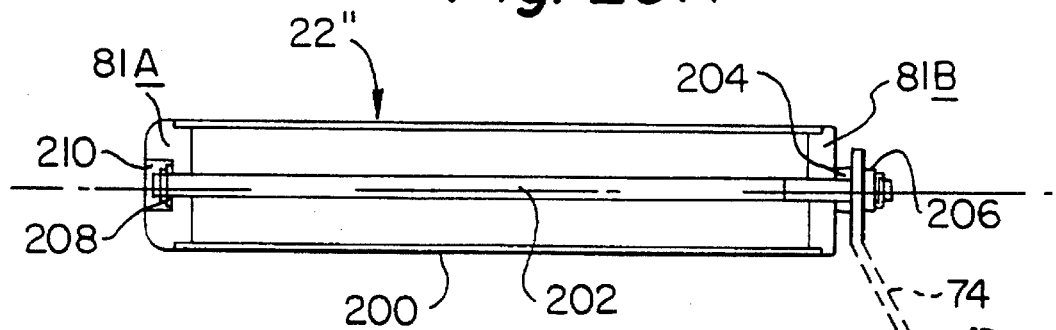
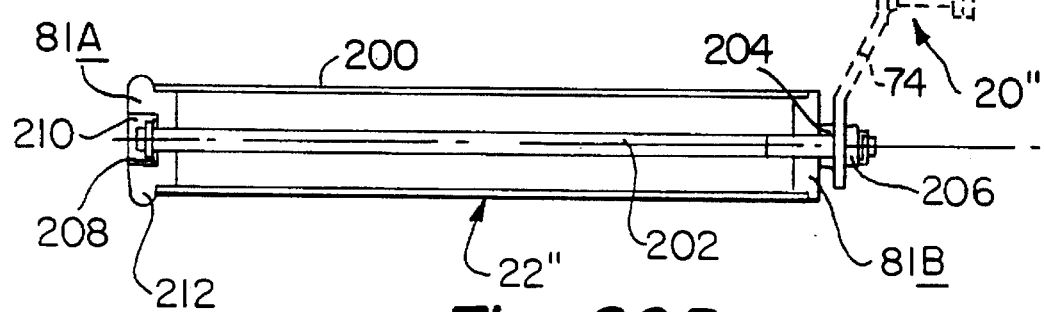
Fig. 20B

PIN OVENS AND TRANSFER DEVICES THEREFOR

This is a continuation application of application Ser. No. 07/784,590 filed on Oct. 29, 1991, now U.S. Pat. No. 5,272,970.

This invention relates to pin ovens, that is to say, to ovens having a thermal enclosure through which is circulated a chain conveyor having regularly spaced projecting pins on which tubular articles to be heated may be supported individually for passage through the enclosure. The invention further relates to transfer devices by which articles may be placed on the pins of the pin oven.

In one particular application, pin ovens are used for the curing or stoving of a water-based or solvent-based surface coating on metal cans for e.g. carbonated beverage products, after the coating has been laid down on the exterior cylindrical surface of the can by a base coater or decorator which is located upstream of the pin oven in relation to the can movement. In such an application the cans are transferred to the pins of the chain conveyor from the coating applicator and after entry into the thermal enclosure are carried by the chain conveyor around a tortuous path defined by upper and lower sets of sprockets.

After emerging from the oven the cans are removed by a stripper device from the pins of the chain conveyor. The stripper device may be located adjacent the exit opening of the thermal enclosure, but for some applications it may be more convenient to locate it adjacent to the entry opening of the enclosure, at the downstream end of the return run of the chain conveyor. Usually, the return run of the chain conveyor is made to pass along the to D of the thermal enclosure.

A major disadvantage of the conventional pin ovens described in the last two paragraphs is their considerable length. For example, a conventional pin oven designed for a throughput of 2000 cans per minute and having thirty-two passes between its upper and lower sprockets is typically thirty meters in length. Not only is this expensive in terms of capital cost, but also the considerable surface area presented by the thermal enclosure results in considerable thermal loss and correspondingly low thermal efficiency. A further disadvantage, resulting from the high conveyor speed (e.g. 260 meters per minute) which is required for high throughput, is that conveyor wear is severe; frequent chain replacement, with consequent loss of production, is therefore necessary.

The present applicants have realised that an increase in the can-carrying capacity per unit length of the chain conveyor will allow the conveyor speed and the length of the oven to be correspondingly reduced, with commensurate improvements in reliability and thermal efficiency of the oven. The invention provides configurations of the conveyor chain which enable this increased can loading to be achieved, together with transfer devices enabling cans to be placed onto the pins of the chain conveyor after deceleration from the higher peripheral speed of the coating apparatus.

In accordance with the present invention from a first aspect there is accordingly provided a pin oven in or for an apparatus for curing or stoving a coating on tubular articles, the pin oven having a thermal enclosure and a chain conveyor arranged to circulate around an endless and substantially planar path which passes through the thermal enclosure, the chain conveyor having two rows of pins which are carried by, and project laterally from, one side of the chain in relation to its plane of circulation, the rows of pins being offset from the chain one inside and the other outside the circulation path. Advantageously, the distances by which the rows of pins are offset from the chain are equal.

In accordance with the invention from a second aspect there is provided a transfer device in or for combination with a pin oven as defined in the previous paragraph, the transfer device having a rotary turret formed with radially extending guideways at spaced intervals therearound, article holding assemblies mounted on the turret for guided movement by respective ones of the guideways and each having holding means for engaging and releasably holding a said article presented thereto, and a cam plate mounted adjacent the rotary turret at the side thereof remote from the holding means and having first and second cam tracks in which cam followers for the article holding assemblies are engaged, rotation of the transfer turret in relation to the cam plate causing the article holding means to be moved between a first position at which to engage and hold a said article presented thereto and a second position, spaced both angularly and radially from the first position, at which to transfer the article to a pin of the chain conveyor.

In order that the invention may be more fully understood embodiments thereof will now be described, by way of example only and with reference to the accompanying drawings. In the drawings:

FIG. 1 is a scrap view in side elevation of the conveyor chain of a pin oven forming a part of a first embodiment;

FIG. 2 shows the length of chain shown in FIG. 1 as seen from above on section II—II of that Figure;

FIG. 6 is a view corresponding to FIG. 1 of the chain conveyor of a second embodiment;

FIG. 7 is a view corresponding to FIG. 2 of the chain conveyor of FIG. 6;

FIG. 8 is a view corresponding to FIG. 3 of the chain conveyor of FIG. 6;

FIG. 9 is a view corresponding to FIG. 4 and showing the transfer device of the second embodiment;

FIG. 10 is a view corresponding to FIG. 5 of the second embodiment;

FIG. 12 is a view corresponding to FIGS. 1 and 6 of the chain conveyor of the third pin oven;

Figure 3:
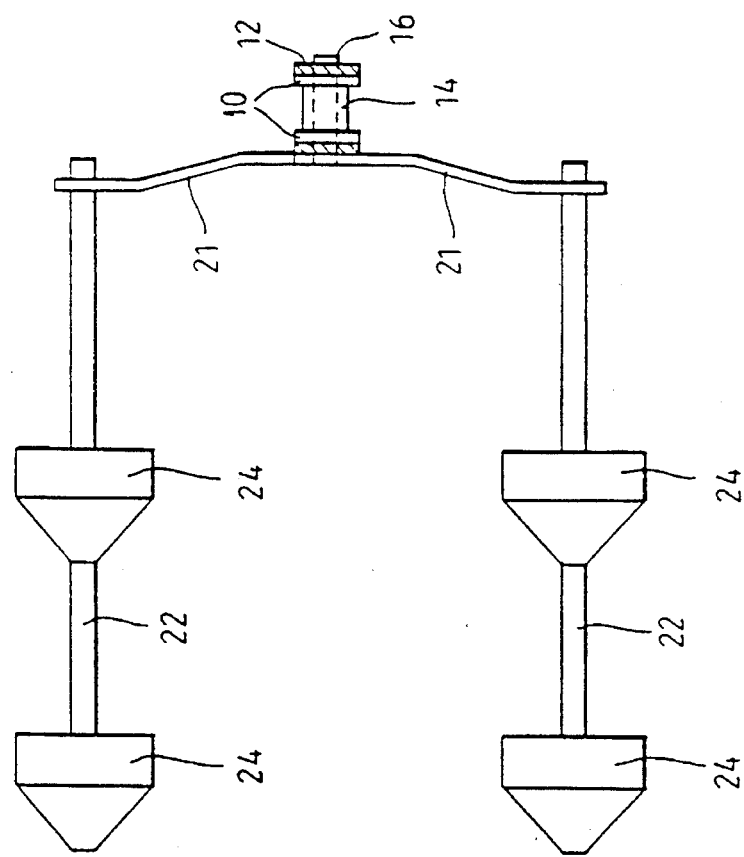
FIG. 3 is an end elevation of the chain taken in section on the line III—III of FIG. 2.
Figure 11:
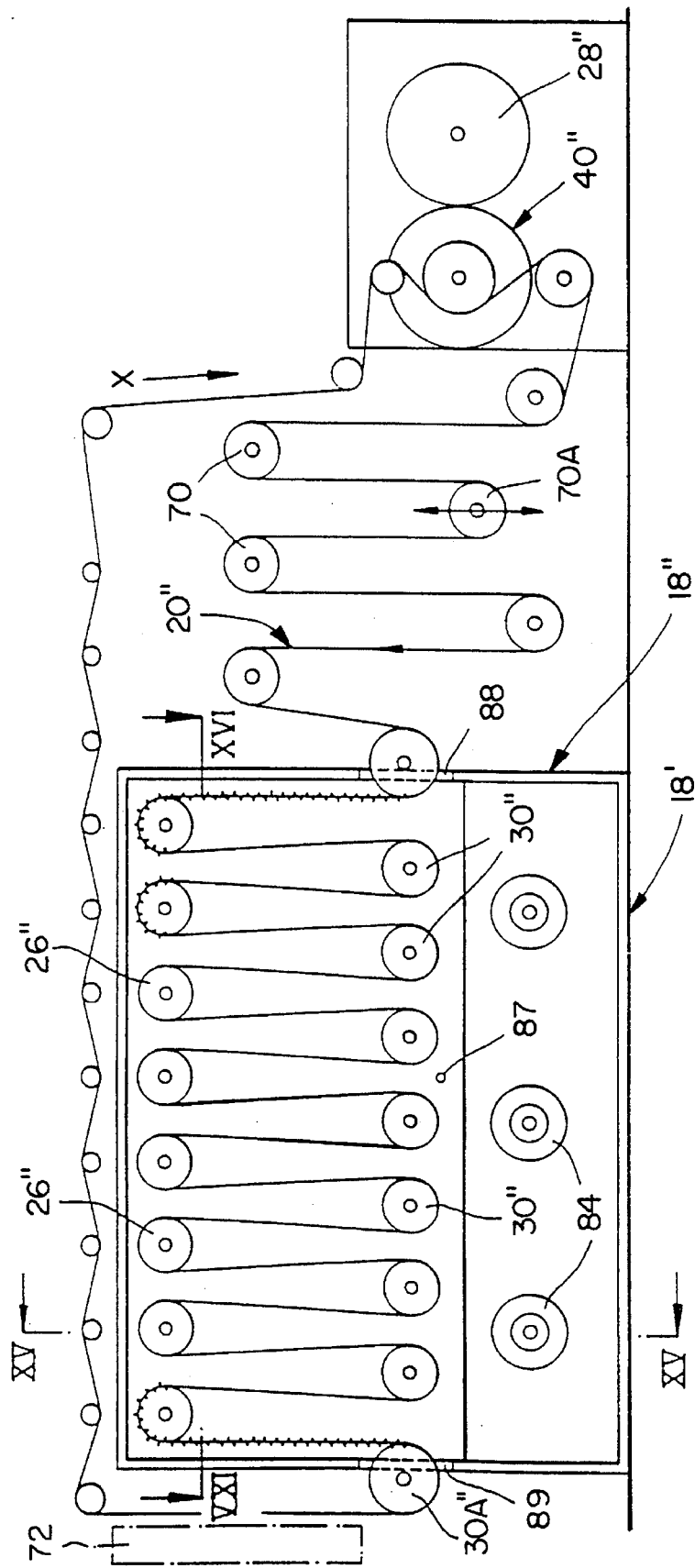
FIG. 11 shows a pin oven forming a third embodiment of the invention, generally as seen on a longitudinal section taken on the line XI—XI of FIG. 15.
Figure 13:
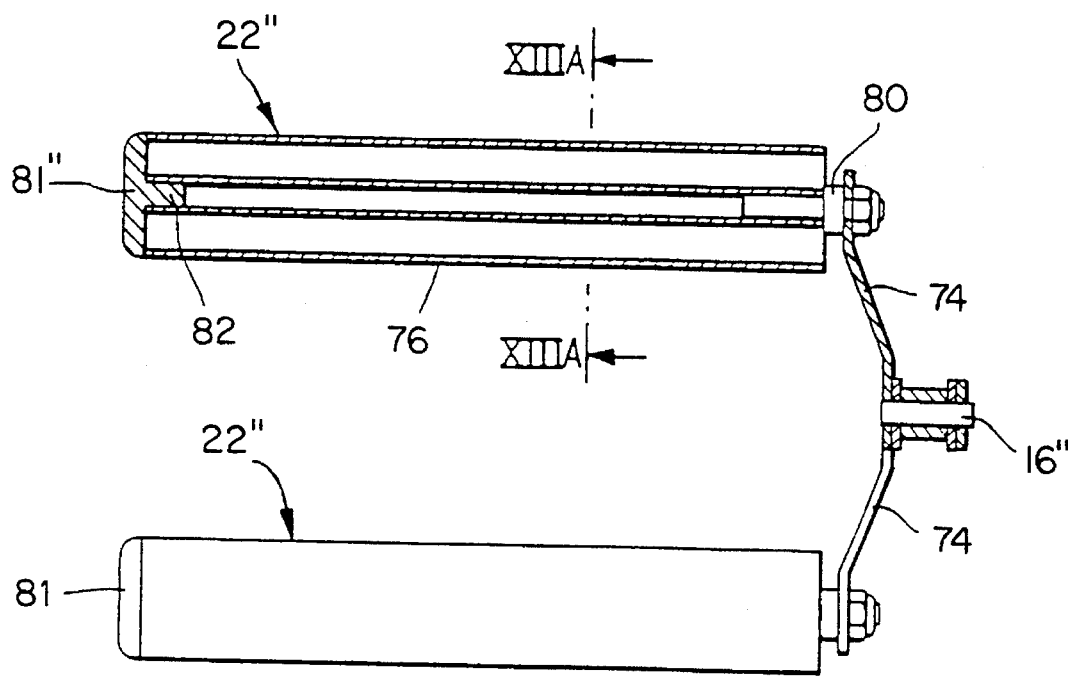
Figure 13A:
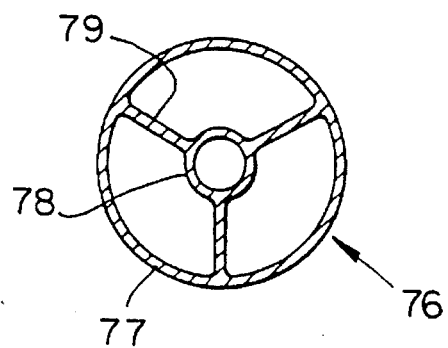
Figure 15:
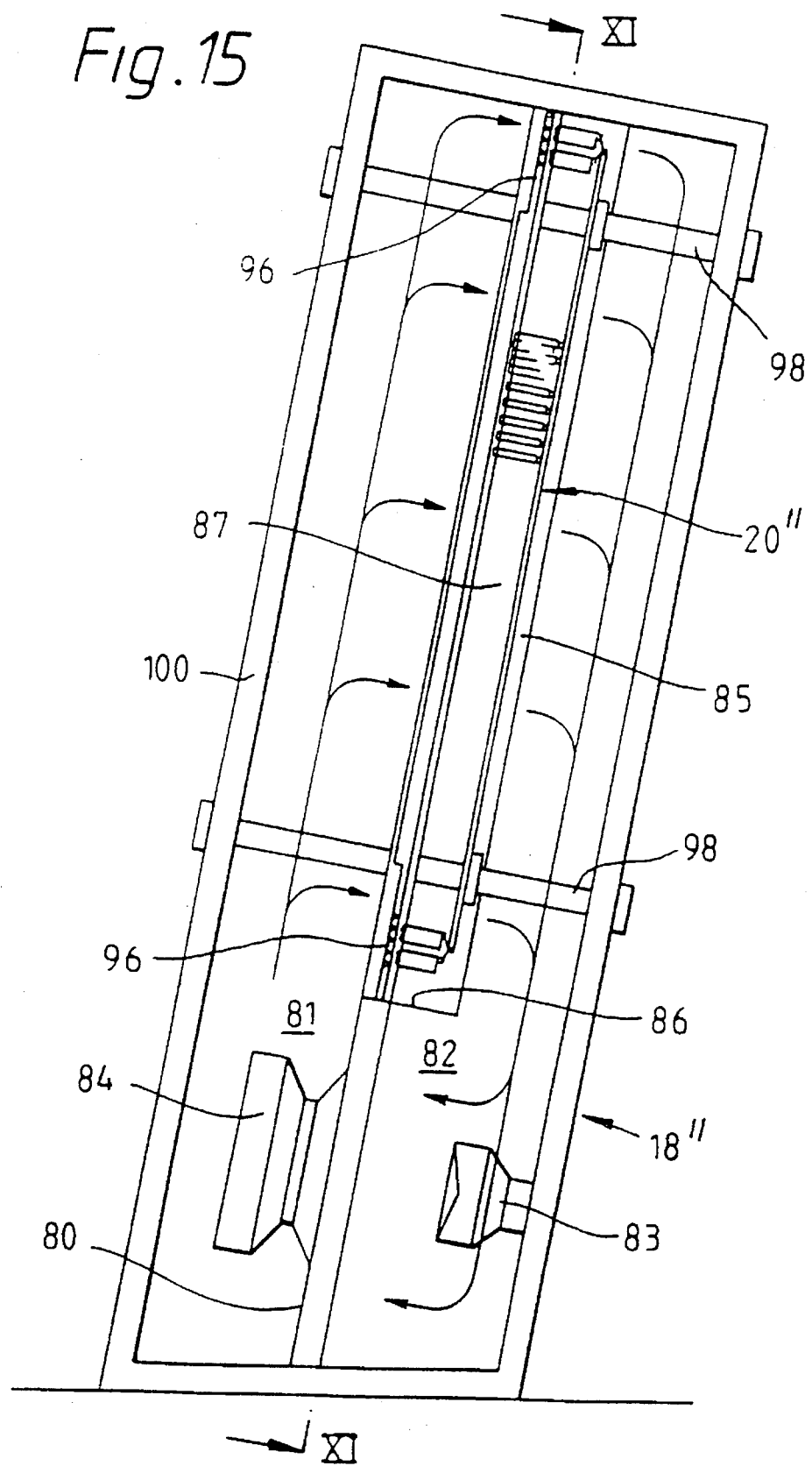
Figure 16:
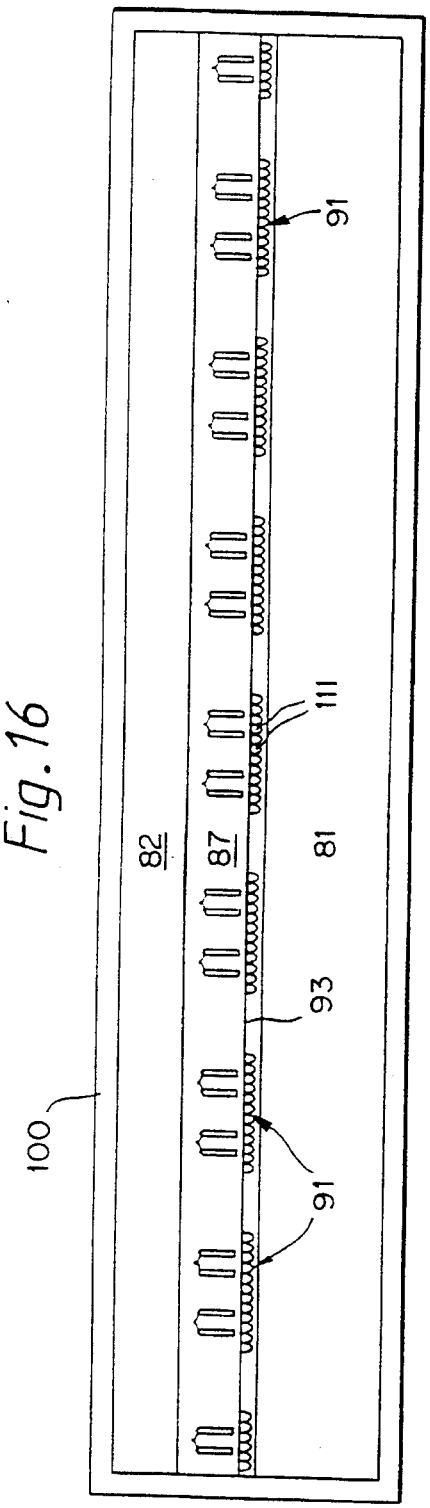
Figure 16A:
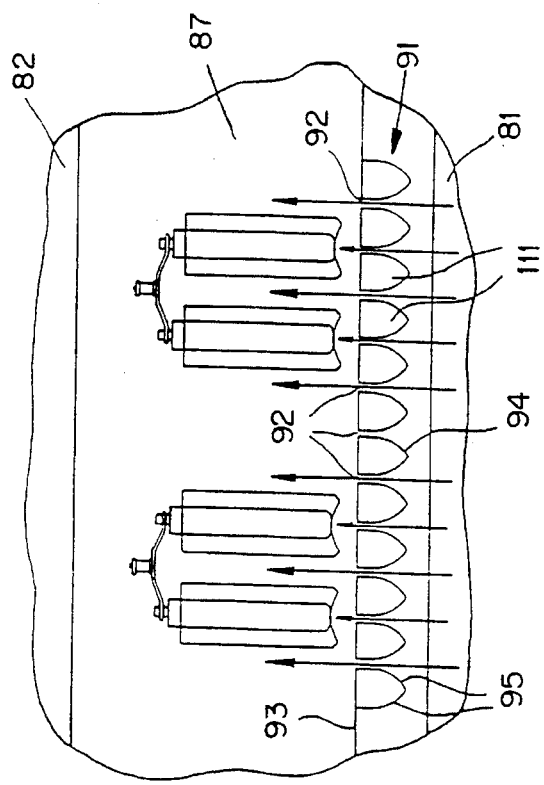

FIG. 13 corresponds to FIGS. 3 and 8 and shows the chain conveyor of the third pin oven;

FIG. 13A is a sectional view of a pin of the third pin oven, in section on line XIIIA—XIIIA of FIG. 13;

FIG. 14 shows a variant of the chain of the third pin oven, in a view corresponding to FIG. 12;

FIG. 15 is an end elevation of the thermal enclosure of the third pin oven, taken in section on the line XV—XV of FIG. 11;

FIG. 16 is a plan view of the thermal enclosure of the third pin oven, taken in section on the line XVI—XVI of FIG. 11;

FIG. 16A is an enlargement of part of FIG. 16;

FIG. 17 shows a nozzle plate by which hot air is directed onto cans within the thermal enclosure of the third pin oven; and FIG. 28 shows the nozzle plate as seen in section on the line XVIII—XVIII of FIG. 7.

Figure 21A:
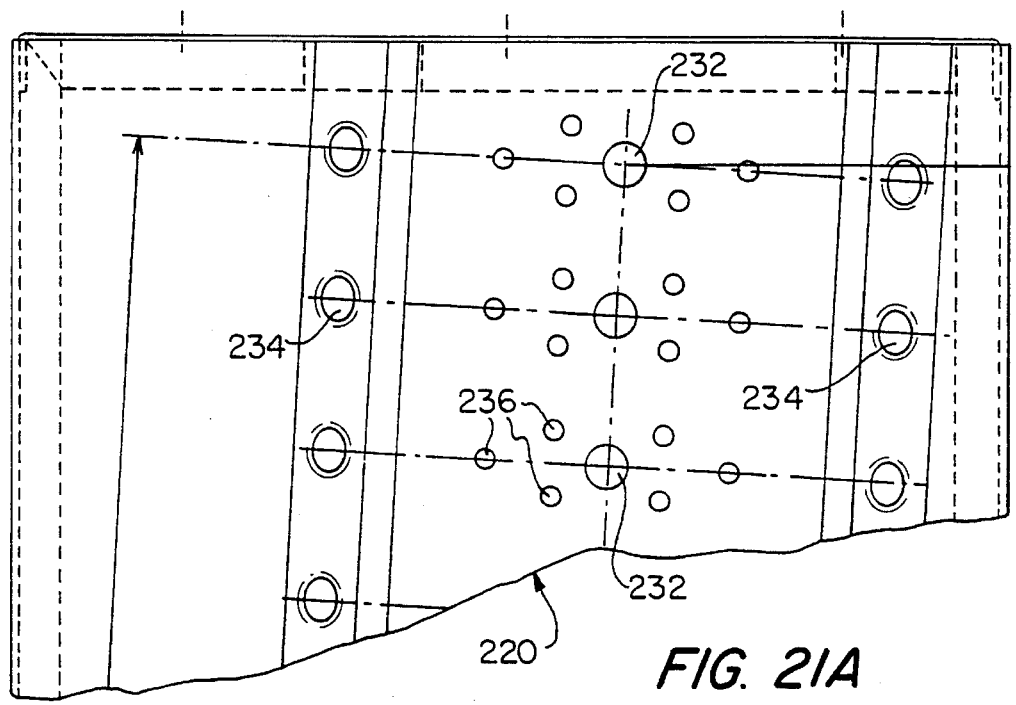
Figure 21B:
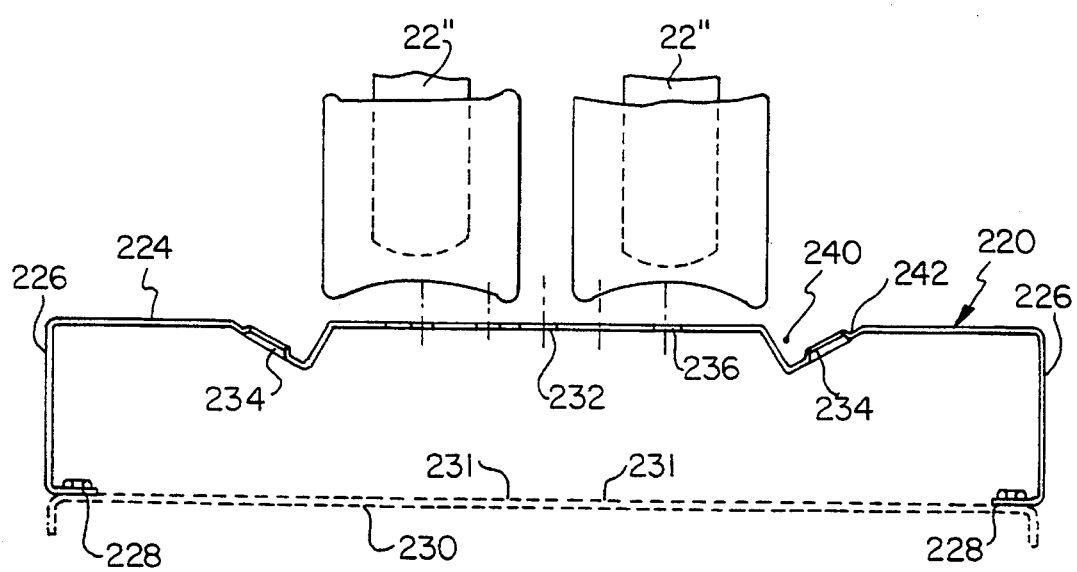
Figure 22:
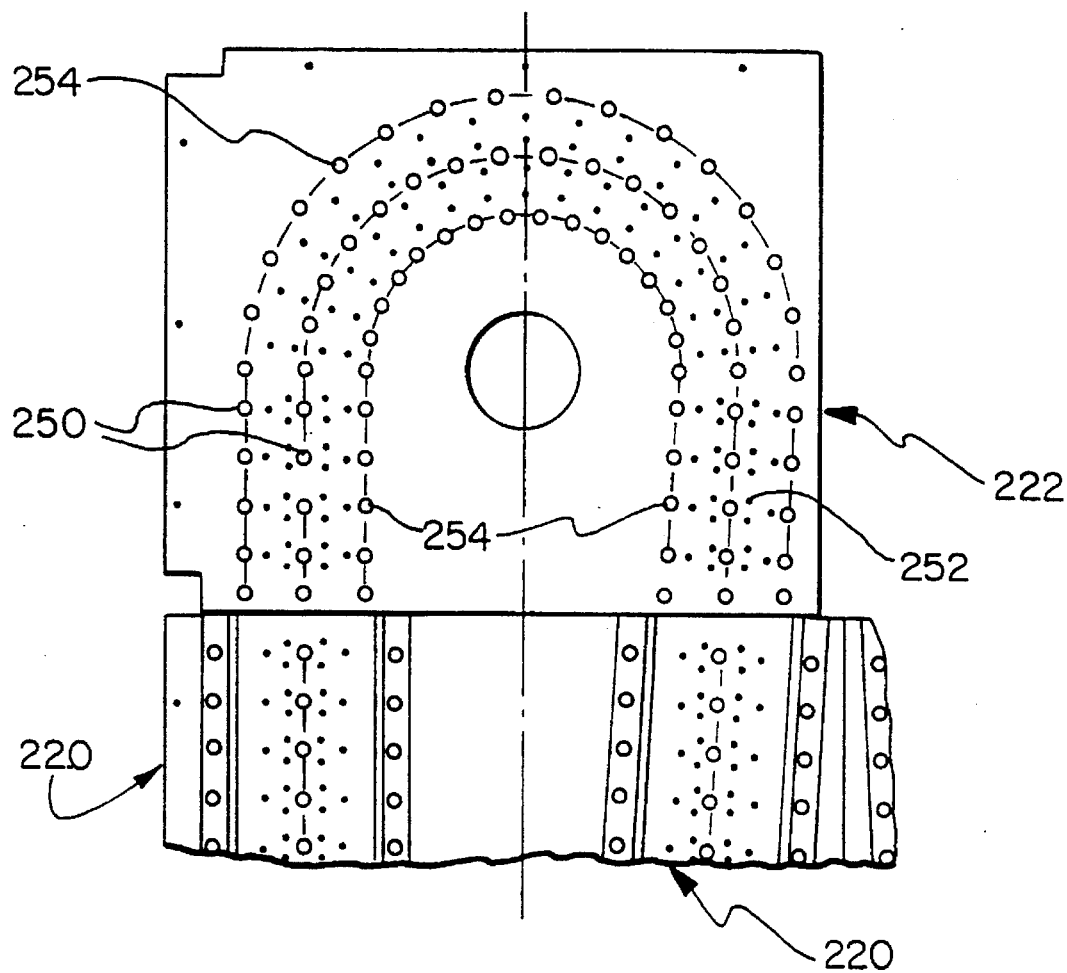

FIG. 19 shows a modification of the chain conveyor of FIG. 12;

FIG. 20A shows a first modification of the chain conveyor of FIG. 13, having a modified form of pin;

FIG. 20B shows a second modification of the chain conveyor of FIG. 13, having a modified form of pin;

FIG. 21A shows one end of a modified nozzle plate for the substantially vertical runs of the pin oven chain within a thermal enclosure of the form generally shown in FIG. 11;

FIG. 21B shows the nozzle plate of FIG. 21A generally transverse cross-section and in relation to cans on the pin oven chain; and FIG. 22 shows on a reduced scale a modified nozzle plate for use in conjunction with the nozzle plate of FIG. 21, at the ends of the vertical runs of the pin oven chain.

Figure 4:
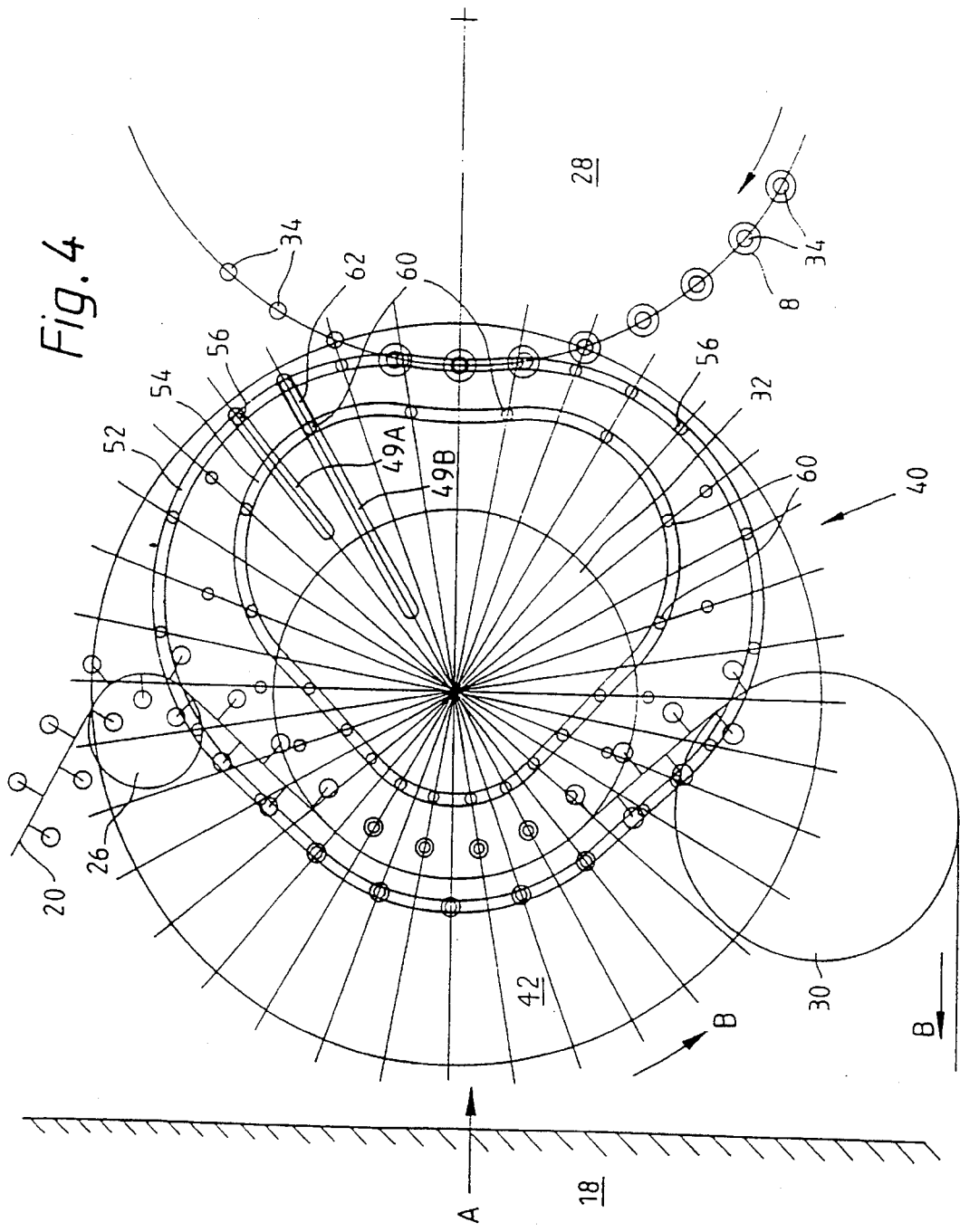
FIG. 4 is a view in side elevation showing part of the pin oven and of the decorator by which beverage cans to be stoved in the pin oven are formed with a decorative coating, and also shows the transfer device by which the beverage cans are transferred from the decorator to the chain conveyor of the pin oven.

The embodiments of the invention which are particularly described below with reference to the drawings share many features in common; for ease of understanding, the same reference numerals, with or without primes, are therefore generally used to indicate like or functionally equivalent parts. The first illustrated embodiment of the invention is arranged to operate on beverage cans 8 having integral bases 9, and includes in oven having an endless chain conveyor of which the arrangement is shown in FIGS. 1 to 3. In known manner the chain has pairs of staggered inner and outer links 10, 12 separated by mutually spaced rollers 14 and attached rotatably together by spindles 16 of the rollers. In FIG. 4 the thermal enclosure of the pin oven is disposed on the left of the drawing as denoted by the reference numeral 18, and its chain is shown in part and denoted by the reference 20.

Along one side (only) of the chain some of the outer links —denoted 12A —or additional outer links (12B) which are provided for the purpose are formed with integral arms 21, 21" which project laterally of the chain substantially in the plane of their respective links and carry pins 22 at their ends. However, arms 21, 21" are offset from rollers 14 enough to prevent interference with s rockets of the oven. Arms 21 carry pins 22 at a position transverse from one of the spindles 16 securing the arms to the chain; arms 21" carry pins 22 at a position symmetrically between spindles 16 securing the arms. Each pin 22 has a pair of spaced support bosses 24 on which a can 8 carried by the pin may be engaged and supported. To strengthen chain 20, spindles 16 may be solid, not hollow as in prior pin chains. This is possible because pins 22 are not mounted directly to spindles 16.

Along the length of the chain the arms 21 extend in alternate directions (i.e. up and down as shown in FIG. 1), so that the pins lie in two parallel rows which are mutually offset longitudinally of the chain by one half of the pin spacing in each row. The arms are of equal length so that the rows of pins are carried at the same distance from, and on opposite sides of, the chain as seen normal to its plane of circulation.

In comparison with the chain of a conventional pin oven, the chain 20 of FIGS. 1 to 3 has twice the number of pins per unit length of the chain; its can-carrying capacity (per unit length) is therefore doubled. This enables the speed of movement of the chain, and hence the length of the thermal enclosure 18, to be halved for the same can throughput and the same dwell time of the can in the oven. Thus the cans can be subject to the same heating régime as in the conventional oven, but the oven has a substantially reduced operating speed and length, with commensurate improvements in reliability and thermal efficiency. It will be understood that the spacing of the two rows of pins and of the pins in each row is sufficient to ensure that at no time can cans 8 on the pins contact one another as they pass through the pin oven.

With the exception of the chain 20 the pin oven is generally of conventional construction, and its details are therefore omitted from this description. Briefly stated, the chain passes along a tortuous path through the thermal enclosure 18 of the oven, and after emergence passes through a can stripper (not shown) by which the cans are removed from the chain. The chain then returns above the thermal enclosure to a sprocket 26 which is shown in FIG. 4.

Figure 5:
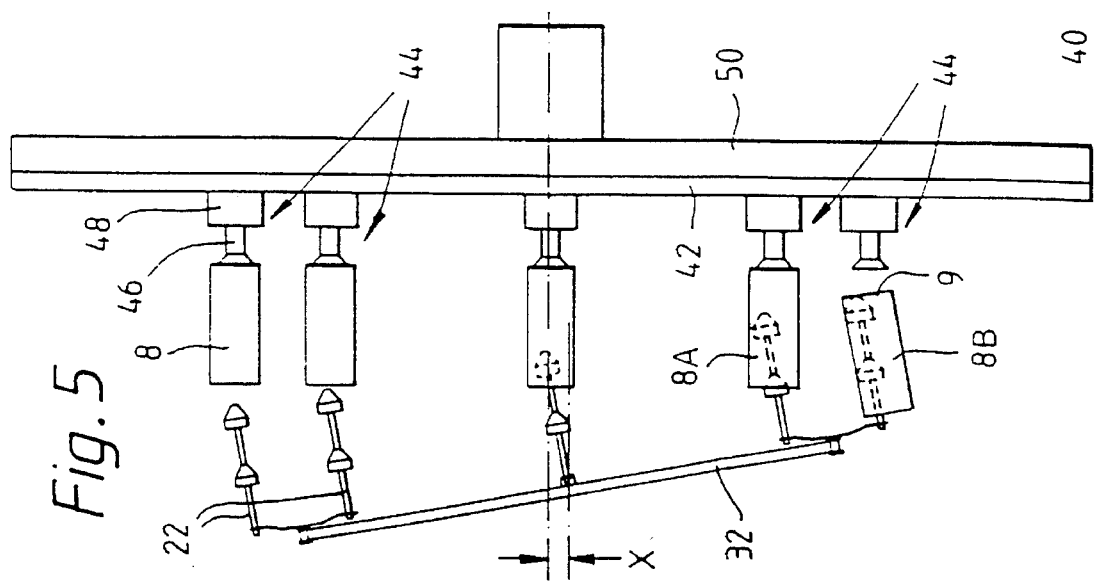
FIG. 5 is a view of the transfer device and the chain conveyor, generally as seen in the direction of the arrow A of FIG. 4.

FIGS. 4 and 5 together illustrate how cans which have just been coated in a conventional rotary coating apparatus such as a decorator 28 are transferred onto the pins of the chain 20 for subsequent curing or stoving in the pin oven.

The transfer of cans from the decorator occurs along a length of the chain which lies between the sprocket 26 mentioned above and a further sprocket 30 which is mounted below the sprocket 26 as shown.

Can transfer generally occurs while the chain 20 is in engagement with a third sprocket 32 which causes it to follow a part-circular path having a substantial radius of curvature and which is reentrant to the overall path around which the chain is circulated. As will later become apparent, the sprocket 32 serves to drive the chain to circulate around its path at the required speed. The direction of circulation of the chain is clockwise as seen in FIG. 4, as indicated by the arrow B.

In known manner the oven is inclined backwardly so that the cans which it carries are retained on its pins with the assistance of gravity. The plane in which the chain circulates is likewise inclined to the vertical by this angle, and correspondingly the axes of rotation of the sprockets 26, 32 and 30 are inclined to the horizontal by the same angle. In FIG. 4 the small degree of visual ovality of the sprockets is not represented.

The decorator 28 may be a conventional rotary device such as is marketed by Rutherford Corporation of USA. It has a rotary turret driven to circulate about a horizontal axis in the clockwise direction as shown in FIG. 4. Thirty-six mandrels 34, of which some only are shown, are spaced at 10° angular intervals around the periphery of the turret and each capable of internally holding and rotating a can as it moves past one or more printing rollers (not shown) as the decorator turret rotates. For brevity the printing stations are not shown in the drawings, but they may be conventional. Also not shown is the device by which the unprinted cans are placed onto the mandrels of the decorator prior to their passage past the printing rollers; this device also may be conventional.

Cans which have been coated in the decorator are moved onto the chain of the pin oven by a transfer device generally denoted 40 in FIGS. 4 and 5. The transfer device has a rotary turret 42 mounted for rotation about a horizontal axis which is spaced by a small vertical distance 'x' (FIG. 5) above the centre of the sprocket 32 in the plane of the chain 20.

The diameter of the turret 42 and its position relative to the decorator 28 are such that, as shown in FIG. 4, over approximately 40° of its rotation the transfer turret lies in overlapped relation with the decorator. The region of overlapping is centred on the common horizontal plane of the axes of rotation of the two turrets. The coated cans therefore move through the overlapped region in an upward and generally tangential direction, and as they do so they are transferred by axial horizontal movement from the decorator to the transfer device in the manner to be described more fully later.

The decorator 28, the transfer turret 42 and the sprocket 32 are driven by a common drive (not shown), so ensuring speed matching to enable satisfactory can transfer not only between the decorator and the transfer device, but also between the transfer device and the pin oven chain 20.

For the purpose of the can transfer between the decorator and the transfer device the effective radii and peripheral speeds of the respective turrets at the point of transfer are the same.

As can be seen from FIGS. 4 and 5, the transfer device 40 has a plurality of sucker assemblies 44 formed of sucker heads 46 and associated mounting blocks 48. One sucker assembly is provided for each 10° of subtended angle of the transfer turret, there therefore being thirty-six sucker assemblies corresponding to the thirty-six mandrels 34 of the decorator 28. Each sucker assembly is movable radially of the transfer turret through a limited distance, and for that purpose the transfer turret has a straight and radially directed guideway 49 formed through it for each sucker assembly. For clarity only two of the guideways, denoted 49A and 49B, are shown in FIG. 4. It will be seen that the guideway 49A is shorter than the guideway 49B, and it is to be understood that shorter guideways 49A and longer guideways 49B alternate around the transfer turret.

Mounted coaxially with the transfer turret 40 on its side remote from the decorator 28 is a stationary cam plate 50. The face of the cam plate which is adjacent to the transfer turret is formed with outer and inner endless cam tracks 52 and 54. In the outer cam track 52 is located one cam follower 56 for each of those sucker assemblies which are associated with the shorter guideways 49A. Axially extending connection shafts (not shown) extend through the shorter guideways to connect the sucker assemblies to the cam followers 56 in such a way that the sucker assemblies correspond at all times in both angular and radial position to their respective cam followers.

The inner cam track 54 likewise serves for cam followers 60 which are associated with the other eighteen sucker assemblies and with the longer guideways 49B. Cam followers 60 are attached together with their sucker assemblies via crank arms 62 which provide a radially inward offsetting of the cam followers in relation to the sucker assemblies. The crank arms lie in and are slidable along their respective guideways 49B, and they thereby ensure that the required angular position of the sucker assemblies is maintained as the transfer device rotates. For clarity only the crank arm associated with the guideway 49B specifically shown is illustrated, but the other crank arms correspond.

In FIG. 4 the cam followers 56, 60 are represented by small circles lying in their respective cam tracks. The sucker assemblies 44 are not shown, but the positions of the sucker heads associated with the inner cam track are indicated by the small crossed circles.

From FIG. 4 it will be understood that on the diametrically opposite side of the transfer device 40 from the decorator 28 the outer cam track 52 is located radially outside the periphery of the sprocket 32 and follows the periphery of that sprocket at a spacing which is equal to the common length of each of the arms of the outer links 12A, 12B of the oven chain 20.

Likewise, over generally the same part of the periphery of the sprocket 32 the inner cam track 54 is located radially inside the sprocket periphery and follows the sprocket periphery at a distance which is equal to the length of the arms 12A, 12B plus the length of the crank arms 62.

The inner cam track is further located so that at the overlapped region of the transfer device with the decorator its associated sucker assemblies 44 are aligned with the sucker assemblies associated with the outer cam track, that is to say, generally tangentially of the decorator and the transfer turret. The transfer of cans from the mandrels of the decorator to successive sucker assemblies of the transfer turret can therefore take place.

It will thus be understood that, with rotation of the transfer turret in the anticlockwise direction, cans transferred from the decorator will be progressively moved into positions in which they form two rows of alternate cans which are disposed on opposite sides of the pin oven chain 20 as seen normal to its plane of circulation. The spacing of the two rows of cans on the sucker heads correspond to those of the pins of the chain, and by virtue of the previously described synchronisation of the transfer device with the chain the sucker assemblies are therefore placed in alignment with the pins of the chain so that transfer of cans from one to the other can take place. Transfer is completed before the chain passes onto the lower sprocket, after which the chain moves into the thermal enclosure of the oven for storing of the cans which it carries.

FIG. 5 illustrates how the transfer of cans 8 from the transfer turret 42 to the pin oven chain 20 is effected. By virtue of the inclination of the pin oven and the sprockets 20, 32 and 30, the pins are progressively entered into the open ends of the cans as the chain and the cans move together around the sprocket 32. Although not shown in the drawings, the sucker heads 46 are to be understood as being connected to a source of reduced pressure. Each sucker head is energised with the reduced pressure on entry to the overlapped region of the transfer turret with the decorator, and is subsequently deenergised when a pin 22 of the chain 20 has entered into the associated can sufficiently to ensure that after release the can will move under gravity to its fully engaged position on the pin. In FIG. 5 the can particularly denoted 8A is shown just prior to release by the associated sucker head, whereas the can denoted 8B has already been released and has moved into its fully engaged position on the pin within it.

Transfer of the cans from the decorator 28 to the sucker heads of the transfer turret 42 may be effected by pneumatic or hydraulic extension of the mandrels 34 to present the cans base-first onto the sucker heads which have been already energised to receive them. The mounting blocks 48 for the sucker heads may include pneumatic or hydraulic rams which additionally or alternatively are used for this purpose. The rams, when provided, may additionally or alternatively be used to assist the transfer of cans from the transfer turret 42 to the pin oven chain 20.

For the reasons previously given, the speed of circulation of the pin oven chain 20 is substantially reduced in relation to that of conventional pin ovens. For convenience it is made to be one half of the peripheral speed of the decorator 28 at its mandrels 34, and the spacing of the pins 22 along the pin oven chain is correspondingly one half of the mandrel spacing. This halving of the speed of the cans between the decorator and the pin oven chain is achieved by making the effective radius of the sprocket 32 equal to one half of that of the decorator, but it will be appreciated that speed reductions by other than a factor of two can be achieved by a corresponding variation of the ratio of the sprocket 32 and decorator radii and of the spacing of the pins on the pin oven chain.

Reference is now made to FIGS. 6 to 10 which show details of a second pin oven in accordance with the invention. The pin oven chain 20' of this second embodiment carries the same number of pins per unit length as chain 20, and likewise has its pins 22' arranged in two rows. However, the pins of its two rows are laterally aligned in pairs, rather than being offset longitudinally of the chain as in the first embodiment. The aligned pins of each pair are carried by laterally projecting arms 21' of a common outer link 12A' or 12B', but otherwise the construction of the chain is largely unchanged, having inner and outer links 10' and 12', rollers 14' and spindles 16'.

As before, the chain 20° is circulated in an inclined plane about upper and lower sprockets 26' and 30' and an intermediate drive sprocket 32' which forms a reentrant, part-circular part of the chain lying between the upper and lower sprockets. Conveniently, as shown, the speed of circulation of the chain is one half of the peripheral speed of the associated coating apparatus, e.g decorator 28', which may again be conventional. The pitch spacing of the pairs of arms 21' longitudinally of the chain is then one half of that of the mandrels 34' of the decorator.

For transferring cans 8 from the mandrels of the decorator onto the pins of the pin oven chain the apparatus of FIGS. 6 to 10 has a transfer device 40' with transfer turret 42' rotatable about a horizontal axis which is spaced by a small distance "x'" above the rotational axis of the sprocket 32' in the plane of the pin oven chain. The transfer turret is backed by a stationary cam plate 50' having outer and inner cam tracks 52' and 54' formed in its face adjacent to the transfer turret. The cam tracks are represented in FIG. 9 by broken lines.

The transfer turret 42' is formed with radially extending guideways 49' of which five only are shown for clarity. The guideways are angularly spaced 20° apart around the transfer turret. Eighteen identical sucker assemblies 44' are individually associated with the guideways. As can be seen from FIG. 9, each sucker assembly has a yoke 48' carrying two sucker heads 46' illustrated by small crossed circles in FIG. 9. A circular shaft 90 which is attached to the yoke centrally between the sucker heads extends through, and is guided for rotation by, the respective guideway in the transfer turret. Beyond the transfer turret the shaft is connected to a roller follower (not shown) which is located in the inner cam track 54' of the cam plate. As the transfer turret rotates in the anticlockwise direction the inner cam track defines the bodily position of the sucker assemblies, the centres of the yokes following the inner cam track as the locus for their movement.

The outer cam track determines the angular position of the sucker assemblies, and for that purpose each sucker assembly has a crank arm 92 attached to its shaft 90 between the transfer turret 42' and the cam plate 50', and a cam follower 94 which is mounted on the free end of the crank arm and located for movement along the outer cam track as the transfer turret rotates. For clarity only one crank arm 92 and its associated cam follower 94 is shown in FIG. 9, but it is to be understood that the other sucker assemblies are likewise provided in an identical manner with these items.

From FIGS. 9 and 10 in particular it will be understood that cans 8' are transferred from the decorator 28' to the transfer turret 42' at a time when the sucker assemblies are aligned tangentially of the transfer turret and the decorator, and their sucker heads 46' are in axial alignment with the decorator mandrels 34' at the overlapped region. As the transfer turret rotates further, however, the sucker assemblies 44' are moved bodily inward by the inner cam track 54' and simultaneously rotated in a clockwise direction by the outer cam track 52'.

By virtue of these two simultaneous movements the sucker assemblies are caused to converge both translationally and rotationally with the pin pairs on the pin oven chain 20', so that the chain therefore passes around the sprocket 32' with its pin pairs presented to respective pairs of sucker heads of the transfer turret. Transfer of the cans between them can generally occur in the same manner as before, assisted by the upward inclination of the pins. Further rotation of the transfer turret thereafter moves the sucker assemblies outwards and rotates them back to their tangential orientation in preparation for receiving a further pair of cans from the decorator.

As with the first embodiment, it is not essential for the chain speed of the pin oven of the second embodiment to be circulated at one half of the peripheral speed of the decorator. Other speed reductions may be provided by suitable spacing of the links of the chain and by appropriate selection of the radius of the sprocket 32'. Also, and as with the first embodiment, the lengths of the arms 21 of the two rows may differ.

FIGS. 11 to 18 show the arrangement of the pin oven of the third embodiment. As with the other embodiments, and as clearly shown in FIGS. 11 and 15, the chain 20" is arranged to circulate in a closed path which is inclined backwardly through a small angle (e.g 10°). As it circulates around the path in the direction of the arrow X (FIG. 11), the chain passes from the transfer device 40" for a rotary can decorator 28" and thence via sprockets 70 into the thermal enclosure 18" of the pin oven. One of the sprockets denoted 70A, is vertically movable and biassed downwards so as to maintain a constant tension in the chain whilst accommodating changes in its length.

Within the thermal enclosure 18" the chain follows a tortuous path around sets of upper and lower sprockets 26" and 30", eventually emerging from the enclosure at lower sprocket 30A". From that sprocket the chain moves upwardly past a stripper device 72 by which the decorated cans placed on the chain by the transfer device 40" and stoved in the thermal enclosure are removed from the chain for onward despatch. The stripper forms no part of the present invention and is therefore not described.

After passing the stripper the chain 20" returns along the top of the oven, above the enclosure 18", to the input end of the pin oven, ready for circulation again past the transfer device 40". As depicted in the drawings, the chain is guided and driven by sprockets for circulation around its closed path. The sprockets may be conventional and suitably positioned; with the exception of the sprockets specifically mentioned above they are therefore not alluded to or referenced.

The can decorator 28" and its associated transfer device 40" may be similar to those featured in FIG. 4, and they are therefore not described again.

FIGS. 12 and 13 show a preferred arrangement of the chain 20", and correspond generally to FIGS. 1 and 3 of the first embodiment. As in the first embodiment the pins 22" of the oven are carried in staggered and offset relation along one of the sides of the chain. However in this embodiment the pitch spacing of successive pins along the chain is equal to four times the pitch spacing of the chain spindles 16", and the pins are carried by identical plates 74 which may, as shown, be cranked longitudinally of the chain, and which are preferably substantially triangular with pins mountable near apexes thereof. The plates form every second outer link of the chain along the side on which they are located. The outer links lying between successive ones of the plates are conventional and denoted by the reference 12".

As is clearly shown in FIGS. 13 and 13A, the construction of the pins 22" of this embodiment is different from that of the other embodiments. The pins are now formed by an aluminium extrusion having a cylindrical outer tube 77, and a hollow core 78 which is carried concentrically within the outer tube by integral webs 79.

The extrusion is mounted to project from the respective plate 74 as required, by push-fitting the core at one end of the extrusion 76 over a projecting stud 80 which is secured to the plate. On plates 74, stud 80 is mounted at a position transverse from one of the spindles 16" securing the plate. In this regard the plate 74 is substantially a right triangle. At the free end of the pin the extrusion is closed by an end fitting 81 of a suitable heat-resistant material such as steel or nylon. The end fitting has a central boss 82 which is push-fitted into the core 79 of the extrusion. If desired, an adhesive may be used for providing additional security for the push-fitted attachment at one or both ends of the pin.

The pin arrangement shown in FIGS. 13 and 13A provides a greater area of pin-to-can contact than is available from a conventional pin of the type shown in FIG. 3, so helping to reduce the possibility of scuffing and damage to the interior surface of the can; in addition, the can cannot adopt a canted or inclined position in relation to the pin, and the risk of clashing between adjacent cans on the chain is reduced. Further, hollow pins heat quicker and weigh less, providing better acceleration and deceleration and less stress on arms 74.

An advantage of the chain arrangement of this and the other described embodiments arising from the laterally offset nature of each pin in relation to the centreline of the chain is that, because the pins are held at a spacing from the chain proper, they and any cans on them are less liable to contamination by oil or grease from the chain.

FIG. 14 shows a variation of the chain of this embodiment, in which the pitch spacing of the pins 22" is made three-and-a-half (instead of four) times that of the spindles 16" of the chain, the pins 22" themselves being of the same construction as before. In its use of a 3½ pitch spacing multiple this variant corresponds to the first embodiment (FIGS. 1 to 5); however, whereas in the first embodiment every third and fourth one of the pins along the length of the chain is carried by additional outer links (12A) specially provided for the purpose, in this chain arrangement no additional outer links are used and the desired pitch spacing is provided by suitable cranking, longitudinally of the chain, of plates 74, 74' and 74" by which the pins are carried. On plates 74' the pins are mounted at a position spaced longitudinally of spindles 16" securing the plates, while on plates 74" the pins are mounted at a position between spindles 16". Plates 74" are substantially isosceles triangles.

As will be seen from FIG. 14 which shows one such sequence, the plates are arranged in repeated sequences each formed of four plates with three conventional outer links 12" between them. By avoiding the use of a second, outermost row of outer links such as the links 12A of FIG. 1, the production of the chains shown in FIGS. 12 to 14 is substantially simplified, and the chains themselves are made inherently more robust.

FIGS. 15 to 18 show details of the thermal enclosure 18" of the pin oven of this third embodiment. FIG. 15 is a view taken generally on section on the line XV—XV of FIG. 11, and shows details of the system by which air is heated and circulated within the enclosure around a closed path which intersects with cans on the chain so that the coating on the cans is stoved in known manner. The inclined attitude of the oven and, in particular, its chain can be clearly seen in FIG. 15. Also shown there is the thermally insulated exterior casing 100 of the enclosure.

As shown in FIG. 15, for the purposes of the hot air circulation system the interior of the thermal enclosure within the casing is subdivided by a longitudinal partition 80 into two main compartments 81 and 82 which are respectively to the front and the back of the oven as seen in side elevation (FIG. 11). For ease of understanding this nomenclature (i.e. "front" and "back") will be used hereafter in relation to the main compartment.

The air within the enclosure is heated by three gas burners 83 which are mounted on the casing within the back compartment 82 at a regular longitudinal spacing. Hot air from the burners is drawn through apertures (not shown) in the partition 80 by three recirculation fans 84 which are aligned axially with the burners. From the fans the heated air moves upwardly within the front compartment 81 and, via apertures (not shown) in the partition 80, to a series of nozzle arrays and nozzle plates by which it is directed onto the cans passing through the thermal enclosure. The arrangement of the nozzle arrays and nozzle plates is described in detail below.

Having passed the cans and delivered heat to them, the air moves through apertures (not shown) in a subpartition 85, and thence into the back compartment 82 where it moves downwardly to the burners 83 and is recirculated within the closed path as has been described.

As can be understood from FIG. 15, the subpartition 85 is disposed in spaced parallel relation to the main partition 80 on the opposite side of the chain conveyor and the cans which it carries. Together with the opposed part of the main partition, the oven casing 100 at the top, and a subfloor 86 at the bottom, the subpartition forms a subchamber 87 of the thermal enclosure within which the chain 20" is arranged to move as it passes through the enclosure between inlet and outlet openings 88 and 89 (FIG. 11) at the entry and exit ends of the casing. Hot air from the burners 83 and the recirculation fans 84 is directed through the subchamber by the nozzle arrays and nozzle plates with the assistance of the openings in the main partition and the subpartition, so as to achieve complete and uniform stoving of the cans by the time they leave the thermal enclosure.

FIG. 16 is a schematic sectional plan view of the enclosure taken along the line XVI—XVI of FIG. 11, FIG. 16A being an enlargement of part of FIG. 16. From FIGS. 16 and 16A it will be seen that, except at the entry and exit ends of the thermal enclosure 18", each pair of vertical runs of the chain 20" associated with an upper sprocket 26" has an associated array 91 of hot air nozzles 92. These nozzle arrays form part of a common dividing wall 93 of the subchamber. They are spaced apart longitudinally of the thermal enclosure, the dividing wall between them being unperforated.

As clearly shown in FIG. 16A, each nozzle array 91 is formed of twelve elongate aluminium extrusions 111 which are mounted to extend generally vertically and in parallel relation to one another and to the respective chain runs. The extrusions are spaced apart to form the nozzles 92 between them.

The extrusions 111 are shaped so as to present sharp leading edges 94 to the incoming hot air, curved side flanks 95 of the extrusions then guiding the hot air into the nozzles 92 which are narrow and parallel-sided. At the back or downstream face of the nozzle array the extrusions present coplanar flat faces to the chain runs with which they are associated.

The hot air passing through the nozzles of the nozzle arrays is required to heat to the required stoving temperature not only the bases of the cans but also their cylindrical side faces. This requires a greater air flow down the sides of the cans than impinges on the can bases, as illustrated by the respective sizes of the arrows 22 in FIG. 16A. In order to achieve this differential air flow the nozzle widths are made to differ correspondingly by variation of the spacing of the extrusions 111.

The nozzle arrays 91 described above serve to heat the cans passing between the upper and lower sprockets 26" and 30". Further heat is supplied to the cans as they pass around the upper and lower sprockets themselves, and for this purpose each sprocket is associated with a respective aluminium nozzle plate 96 the detailed arrangement of which is shown in FIGS. 17 and 18.

Each nozzle plate 96 is planar and rectangular, except for a part-circular notch 97 which is dimensioned to accommodate the shaft 98 (FIG. 15) on which the associated sprocket is mounted. It is machined with five part-circular and concentric slots 99 which are centred on the notch. For structural rigidity of the nozzle plate the slots are interrupted along two radially extending bridge region 119, so as to have three component parts 99A, 99B and 99C; moreover, for their function to act as directional hot air nozzles the slots have had a convergent mouth 120 and a straight-sided narrow throat 121 ( FIG. 18).

The widths and relative spacing of the slots 99 and their positions in relation to the notch 97 are such that the slots form matched continuations of the vertical nozzles 92 of the arrays 91. As illustrated, mouths 120 of slots 99 are narrower along the can paths and wider between and along outer surfaces of the cans. It will therefore be appreciated that a can carried on one of the pins 22" will be subjected to a substantially continuous hot air flow as it passes through the thermal enclosure. In moving between the upper and lower sprockets 26", 30" the can will be subjected to hot air from the nozzle arrays 91, and as it passes with the chain 20" around the upper and lower sprockets themselves the can will be subjected to hot air from the nozzle plates 96. The arrangement shown in FIGS. 13 and 13A for the pins 22" may with advantage be used for the chain conveyors 20, 20' of the pin ovens of FIGS. 1 to 5 and FIGS. 6 to 10.

FIG. 19 shows a modification of the chain 20" of FIG. 12, in which the plates 74" mount the pins at positions uncranked longitudinally of the chain, each pin being symmetrical in relation to the pairs of spindles 16" by which its plate 74" is secured. Chain 20" is most preferred because pins 22" are mounted on isosceles triangular plates 74" which are stronger than arms, and advance successive cans through identical arcs as rollers 14 of chain 20" are engaged by sprockets. The pitch spacing of successive pins 22" of the chain is equal to four times that of the spindles 16" where, as illustrated, plates 74" are alternated with conventional links.

FIGS. 20A and 20B show modifications of the pins 22", which for the purposes of illustration only are shown in relation to a common chain 20" with plates 74, 74' and 74". In each of FIGS. 20A, 20B the pin has a cylindrical, extruded aluminium, body 200 with end fittings 81A, 81B of a heat-resistant material (e.g. steel or nylon) push-fitted into its ends. The end fittings are themselves fitted on, and supported by, a central steel rod 202 having a threaded end at which it is secured to its respective plate 74, 74', 74" by locknuts 204, 206. The body with its end fittings is held captive on the rod as an assembly, by a circlip 208 which is located in a central recess 210 formed in the end fitting 81A. Removal of the circlip allows the assembly of body and end fittings to be readily slid off the rod for replacement when required.

The pins 22" of FIGS. 20A, 20B differ. The pin of FIG. 20B has the radii of its body 500 and end fitting 81B reduced in relation to the corresponding radii of the pin of FIG. 20A, and part of its end fitting 81A is formed with an annular projection 212 which stands correspondingly proud of the exterior surface of the body 200. It will therefore be understood that, whereas the pin of FIG. 20A will make line engagement with a container carried by it (including engagement with its body 200), a container on the pin of FIG. 20B will only be engaged by the pin at the fittings 81A, 81B at each end. For some applications this is found to gived a reduced tendency to damage or mark the interior surfaces of the containers, and is preferred for that reason. Pins 22" are preferably about 20 to 35 mm, most preferably about 25 to 30 mm, in diameter for cans typically about 2 to 3 inches in diameter.

FIGS. 21 and 22 together illustrate a modification of the thermal enclosure of FIGS. 15 to 18, FIGS. 21A and 21B showing the arrangement of one of the elongate nozzle plates 220 which replace the nozzle arrays 91 (FIG. 16B) for the substantially vertical runs of the pin oven chain, and FIG. 22 likewise showing the arrangement of the nozzle plates 222 which replace the nozzle plates 96 (FIGS. 17 and 18) adjacent the upper and lower sprockets about which the chain runs.

Referring to FIGS. 21A and 21B, each nozzle plate 220 is pressed from aluminium sheet and is rectangular. It is formed with a major face 224 and two opposed faces 226 along the sides of the major face. The side faces carry inturned and coplanar flanges 228 forming the free edges of the sheet. A diffuser sheet 230 formed with apertures 231 is bolted to the flanges so as to complete a generally rectangular box section of which the face 224 forms the front.

The face 224 is generally planar. It is formed with a first row of regularly spaced circular apertures 232 centred with respect to the pin oven chain, and two identical second rows of circular outer apertures 234 disposed at an equal spacing one on each side of the centreline. The apertures 234 of the outer rows are aligned with those (232) of the first row transversely of the nozzle plate. Two further rows of circular apertures 236, formed of clusters of three apertures each, are disposed between the first and second rows in a symmetrical arrangement. It will be seen that the apertures 236 are substantially smaller than the apertures 232 and 234, which are of the same diameter as one another.

FIGS. 21B shows the nozzle plate 220 in relation to the adjacent ends of cans passing along the chain 20" on respective pins 22". The central apertures 232 correspond in lateral position to the centreline of the chain and serve to direct hot air along the inner sides of the cans of the two rows, the outer apertures 234 likewise directing hot air along the outer sides of the cans of the rows. The smaller apertures 236 direct hot air against the bases of the cans and along the adjacent can sides within each can row, so that the exterior surface of each can is subject to substantially uniform heating by the hot air.

For optimal heating effect the outer apertures 234 are inclined inwardly towards the can rows through an angle of about 30°. This is achieved by localised deformation of the nozzle plate to form triangular-section straight grooves 240 in the outer face 242 of which the apertures 234 are formed. Other than at these grooves the major face 224 is plane.

The arrangement of the nozzle plates 222 which serve for the pin oven chain as it passes around the top and bottom sprockets 26", 30" (FIG. 11) is apparent from FIG. 22, which shows one of the plates in relation to the adjacent nozzle plates 220 beneath it. The nozzle plate 222 is plane; it is formed with a central row of apertures 250 identical to, and serving the same function as, the apertures 232, and rows of clustered apertures 252 likewise corresponding to the apertures 236. Apertures of the nozzle plate 222 corresponding in function to the outer apertures 234 are provided, but they are not inclined at an angle in the manner of the apertures 234; to compensate for the lack of inclination they are located correspondingly closer to the apertures 252 than were the apertures 234 to the apertures 236. They are denoted by the reference numeral 254.

I claim:

1. A pin oven for curing articles comprising:

a thermal enclosure;

pluralities of links, arms and spindles;

a chain having first and second sides, the first side of said chain formed from said links and the second side of said chain formed from said arms and said links, the links and arms of said sides spaced apart and mounted together with said spindles;

a sprocket having teeth and mounted for rotation within said thermal enclosure;

said chain disposed to circulate along a chain path through said thermal enclosure and around said sprocket with said sprocket teeth engaged between said spindles; and a plurality of pins extending from said arms for receiving the articles and conveying them through said thermal enclosure;

said arms laterally extending from said chain such that the articles on said pins are conveyed along one of first and second article paths laterally spaced apart from but substantially parallel to the chain path, wherein the first article path is inside and the second article path is outside the chain path, wherein the first article path overlaps said sprocket, and wherein said arms presenting pins along the first article path are offset from said spindles by a distance sufficient to prevent interference between said arms and said sprocket, wherein said first article path arms include a double bend which separates, by the offset, a first plane at which said arms are connected to said spindles from a second plane at which said pins are connected to said arms.

2. The pin oven of claim 1 wherein said pins extend substantially perpendicular to a plane of circulation of said chain.

3. The pin oven of claim 2 wherein said pins following the first and second article paths are spaced from the chain path by about the same distance.

4. The pin oven of claim 1 including a plurality of rollers mounted for rotation around said spindles, and wherein said sprocket teeth engage said chain between said rollers.

5. The pin oven of claim 1 wherein said pins are hollow.

6. A pin oven for curing articles and a transfer device for transferring articles to the pin oven, comprising:

a thermal enclosure;

pluralities of links, arms and spindles;

a chain having first and second sides, the first side of said chain formed from said links and the second side of said chain formed from said arms and said links, the links and arms of said sides spaced apart and mounted together with said spindles;

a sprocket having teeth and mounted for rotation within said thermal enclosure;

said chain disposed to circulate along a chain path through said thermal enclosure and around said sprocket with said sprocket teeth engaged between said spindles;

a plurality of pins extending from said arms for receiving the articles and conveying them through said thermal enclosure;

said arms laterally extending from said chain such that the articles on said pins are conveyed along one of first and second article paths laterally spaced apart from but substantially parallel to the chain path;

a rotary member formed with radially extending guides;

article holding assemblies for releasably holding articles and mounted for movement along the guides; and cam means for mounting together with said article holding assemblies and said rotary member such that, upon rotation of said rotary member, said article holding assemblies move from a first position to a second position, spaced both angularly and radially from the first position, at which the articles are released from said article holding assemblies onto said pins.

7. The pin oven and transfer device of claim 6 wherein said rotary member guides comprise first and second guides disposed alternately therearound, and wherein said article holding assemblies comprise first and second assemblies respectively mounted for movement along said first and second guides, and wherein said cam means comprises first and second can faces respectively moving said first and second assemblies to first and second radial locations in the second position.

8. The pin oven and transfer device of claim 6 wherein said article holding assemblies move radially inwardly from the first to the second position.

9. The pin oven and transfer device of claim 6 wherein said article holding assemblies releasably hold two articles.

10. The pin oven and transfer device of claim 9 wherein said cam means comprises first and second cam faces respectively rotating and radially moving said article holding assemblies.

11. The pin oven and transfer device of claim 9 wherein the two articles are releasably held by said article holding assemblies at different radial locations in the second position.

12. A pin oven for curing articles comprising:

a thermal enclosure;

pluralities of links, arms and spindles;

a chain having first and second sides, the first side of said chain formed from said links and the second side of said chain formed from said arms and said links, the links and arms of said sides spaced apart and mounted together with said spindles;

a sprocket having teeth and mounted for rotation within said thermal enclosure;

said chain disposed to circulate along a chain path through said thermal enclosure and around said sprocket with said sprocket teeth engaged between said spindles;

a plurality of pins extending from said arms for receiving the articles and conveying them through said thermal enclosure;

said arms laterally extending from said chain such that the articles on said pins are conveyed along one of first and second article paths laterally spaced apart from but substantially parallel to the chain path, wherein the first article path is inside and the second article path is outside the chain path, wherein the first article path overlaps said sprocket, and wherein said arms presenting pins along the first article path are offset from said spindles by a distance sufficient to prevent interference between said arms and said sprocket; and a second sprocket having teeth and mounted for rotation within said thermal enclosure, and wherein said chain circulates around said second sprocket with said sprocket teeth engaged between said spindles, and wherein the second article path overlaps said sprocket, and wherein said arms presenting pins along the second article path are offset from said spindles by a distance sufficient to prevent interference between said arms and said second sprocket.

13. The pin oven of claim 12 wherein said second article path arms include a double bend which separates the first and second planes by the offset.

14. A pin oven for curing articles comprising:

a thermal enclosure;

pluralities of links, arms and spindles;

a chain having first and second sides, the first side of said chain formed from said links and the second side of said chain formed from said arms and said links, the links and arms of said sides spaced apart and mounted together with said spindles;

a sprocket having teeth and mounted for rotation within said thermal enclosure;

said chain disposed to circulate along a chain path through said thermal enclosure and around said sprocket with said sprocket teeth engaged between said spindles; and a plurality of pins extending from said arms for receiving the articles and conveying them through said thermal enclosure;

said arms laterally extending from said chain such that articles on said pins are conveyed along one of first and second article paths laterally spaced apart from but substantially parallel to the chain path, wherein the first article path is inside and the second article path is outside the chain path, wherein said pins following the first article path are longitudinally spaced apart with respect to said chain from said pins following the second article path.

15. The pin oven of claim 14 wherein said arms are substantially triangular plates.

* * * * *